(12) United States Patent
Vermande

(10) Patent No.: US 10,184,523 B2
(45) Date of Patent: Jan. 22, 2019

(54) FAIL SAFE BEARING

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 0 days.

(21) Appl. No.: 15/475,332

(22) Filed: Mar. 31, 2017

(65) Prior Publication Data
US 2017/0350454 A1 Dec. 7, 2017

(30) Foreign Application Priority Data

Jun. 6, 2016 (EP) ..................... 16305657

(51) Int. Cl.
F16C 41/00 (2006.01)
F16C 39/02 (2006.01)
F16C 17/02 (2006.01)
F16C 19/52 (2006.01)
F16C 21/00 (2006.01)

(52) U.S. Cl.
CPC ............ *F16C 41/008* (2013.01); *F16C 17/02* (2013.01); *F16C 19/52* (2013.01); *F16C 21/00* (2013.01); *F16C 39/02* (2013.01); *F16C 2233/00* (2013.01); *F16C 2237/00* (2013.01); *F16C 2326/43* (2013.01)

(58) Field of Classification Search
CPC ............................... F16C 19/522; F16C 21/00
USPC ........................................................ 384/620
See application file for complete search history.

(56) References Cited

U.S. PATENT DOCUMENTS

| | | | |
|---|---|---|---|
| 3,183,043 A | 5/1965 | Creeger | |
| 4,058,353 A * | 11/1977 | Frommlet | B64C 27/605 384/492 |
| 4,063,786 A | 12/1977 | Rall | |
| 5,993,069 A | 11/1999 | Arrasmith et al. | |
| 5,998,894 A | 12/1999 | Raad | |
| 7,008,114 B2 * | 3/2006 | Derscheid | A01D 75/18 384/448 |
| 7,299,703 B2 | 11/2007 | Balasu et al. | |
| 7,736,062 B2 * | 6/2010 | Hagshenas | F16C 21/00 384/428 |
| 8,087,832 B2 * | 1/2012 | Blades | F16C 11/045 384/448 |

FOREIGN PATENT DOCUMENTS

FR 3021374 A1 11/2015

OTHER PUBLICATIONS

Extended European Search Report for International Application No. 16305657.5, dated Nov. 21, 2016, 10 pages.

\* cited by examiner

*Primary Examiner* — Thomas R Hannon
(74) *Attorney, Agent, or Firm* — Cantor Colburn LLP

(57) ABSTRACT

A rotating shaft assembly comprising a rotating shaft mounted within a casing and a primary bearing assembly in bearing engagement with the shaft and the casing and positioned between the shaft and the casing. The assembly also includes a secondary bearing assembly comprising a secondary bearing normally radially spaced from the shaft and arranged to engage with or contact the shaft in the event of failure of the primary bearing normally in contact with the shaft, and an inspection member to provide an indication of frictional engagement of the secondary bearing with the shaft.

6 Claims, 2 Drawing Sheets

FAIL SAFE BEARING

FOREIGN PRIORITY

This application claims priority to European Patent Application No. 16305657.5 filed Jun. 6, 2016, the entire contents of which is incorporated herein by reference.

TECHNICAL FIELD

The present disclosure relates to fail safe bearings or secondary or back-up bearings and to identifying failure of primary bearings.

BACKGROUND

Bearings find application in many mechanical structures with moving parts, particularly rotating parts. Bearings are provided as e.g. ball-bearings between two relatively rotating parts such as gear components or rotating shafts. By way of example, aircraft have many rotating parts such as generators, motors or actuators. It is important that any failure in such parts can be quickly and reliably identified and that in the event of failure of, e.g., a bearing, the component can continue to operate safely until the failed part can be repaired or replaced.

It is known to provide redundancy in many machine or mechanical systems for parts that might fail, particularly where safety is a primary consideration, such as in aircraft. Secondary or back-up bearings are taught in e.g. U.S. Pat. No. 3,183,043, U.S. Pat. No. 5,993,069 and U.S. Pat. No. 7,299,703 where a secondary bearing or journal bearing, which is normally unloaded—i.e. out of engagement with the rotating part—comes into play in the event that the primary bearing, which is normally loaded—i.e. in bearing engagement with the rotating part—fails. These systems can also provide an indication that the primary bearing has failed and the secondary bearing is in use, so that the primary bearing can be replaced or repaired as soon as possible, thus minimising the time the system has to rely on the emergency, secondary bearing.

In systems where downtime is undesirable and costly, there is a need for a fail safe bearing system where failure of a primary bearing can be easily and quickly identified without the need for complex sensors and the like—such sensors add to the cost, weight and power consumption of a machine or the like, all of which are generally undesirable, especially in e.g. aircraft.

Particularly, but not exclusively, steps are being taken to provide several points of redundancy in aircraft parts to provide tolerance to failure of mechanical components and improve safety as well as reduce down-time. One area where failure can occur is in the bearings provided around rotating shafts.

It is an aim of the present disclosure to provide a fail safe bearing which enables identification of failure of a primary bearing by simple visual and/or tactile inspection.

SUMMARY

The present disclosure provides, in one aspect, a bearing assembly comprising a secondary bearing arranged to make contact with a rotating part in the event of failure of a primary bearing normally in contact with the rotating part, and means for insertion and/or removal of an inspection member to provide an indication of engagement of the secondary bearing with the rotating part.

In another aspect, the disclosure provides a method of identifying failure of a primary bearing, in a bearing assembly, by examining a mechanical property of an inspection member inserted in the bearing assembly for an indication of engagement of a secondary bearing with a rotating part, wherein the primary bearing is normally in engagement with the rotating part and the secondary bearing is normally not in engagement with the rotating part, the secondary bearing coming into engagement with the rotating part in the event of failure of the primary bearing.

In one preferred embodiment, the secondary bearing includes the removable inspection member such that a property of the inspection member changes due to engagement of the secondary bearing with the rotating part. The inspection member may be, e.g., a pin in the secondary bearing that also contacts the rotating member along with the secondary bearing and whose physical properties are changed by the frictional contact—e.g. the pin material may become worn. The pin can then be removed and examined, and the wear etc. can be an indication of engagement of the pin/secondary bearing and thus of failure of the primary bearing. Examination could reveal frictional engagement of the secondary bearing pin, or distortion e.g. of a softer material could provide an indication of engagement of the secondary bearing.

In another embodiment, rather than having an integral inspection member such as a pin, the bearing assembly may be provided with one or more inspection ports via which the relative position and/or backlash of the rotating part with respect to the secondary bearing can be determined e.g. by insertion of an inspection jig. This can also provide an indication of engagement of the secondary bearing and this failure of the primary bearing.

In another aspect, the disclosure provides a rotating shaft assembly comprising a rotating shaft mounted within a casing, and a primary bearing assembly in bearing engagement with the shaft and the casing and positioned between the shaft and the casing; the assembly further comprising a secondary bearing assembly comprising a secondary bearing normally radially spaced from the shaft and arranged to frictionally engage with the shaft in the event of failure of the primary bearing normally in contact with the shaft, and means for insertion and/or removal of an inspection member to provide an indication of frictional engagement of the secondary bearing with the shaft.

The means for insertion and/or removal of the inspection member may be receiving means in the secondary bearing containing an inspection member such as a pin which is positioned to frictionally engage with the rotating part/shaft when the secondary bearing engages with the rotating part shaft, and wherein the frictional engagement changes a characteristic of the inspection member e.g. by causing wear of the pin etc. material. The inspection member can be removed from the secondary bearing and examined for e.g. wear or distortion and this provides an indication that the secondary bearing is in engagement which, in turn, indicates failure of the primary bearing.

In an alternative embodiment, the bearing assembly may be provided with an inspection port/inspection ports into which an inspection member such as a jig can be inserted to measure the positioning and degree of backlash of the rotating part/shaft which provides an indication that the primary bearing has failed.

Preferred embodiments will now be described by way of example only with reference to the drawings.

DETAILED DESCRIPTION

The bearing assembly will be described in relation to a shaft in an aircraft, e.g. in a flight control actuator, by way of example. The bearing assembly can, however, be used with any rotating parts having a bearing.

Figure 1:
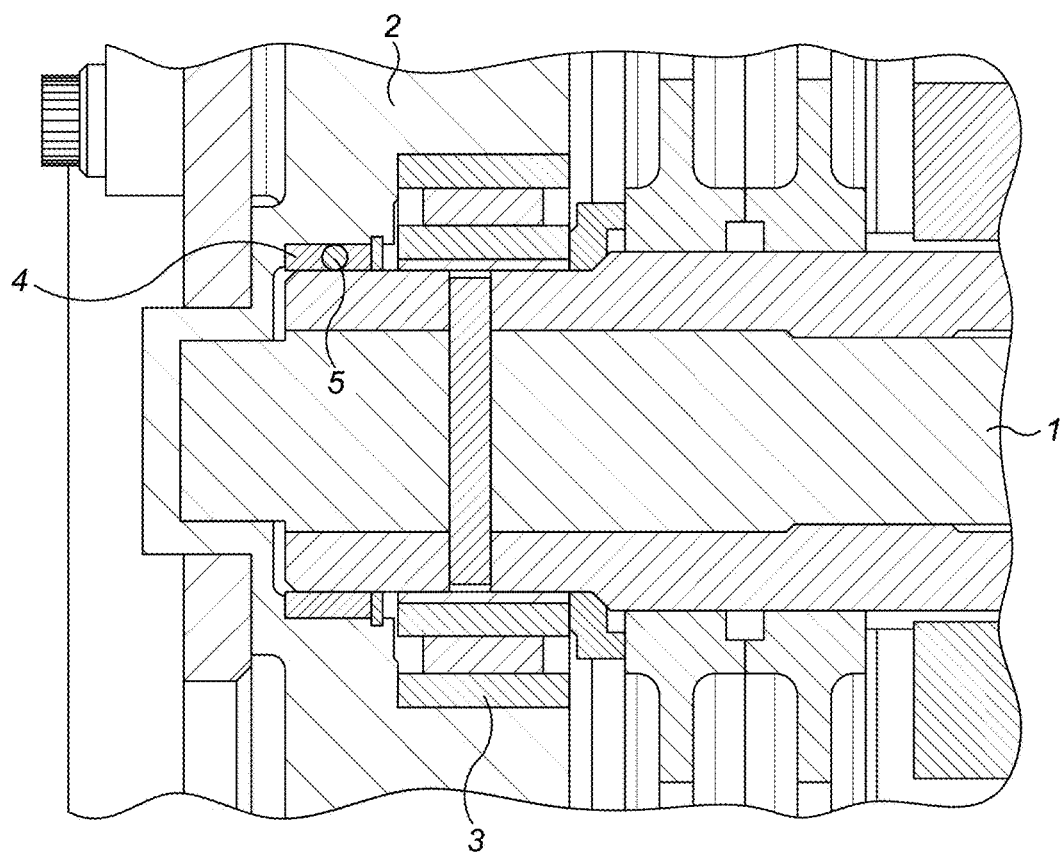
FIG. 1 is a side section view of an embodiment of the fail safe bearing assembly of the present disclosure.

Referring to FIG. 1, part of an aircraft actuator is shown by way of an example of an application for the bearing assembly of the present disclosure.

The actuator includes a rotating shaft 1 mounted within a casing 2. The other components of the actuator are standard and will not be described herein.

A primary bearing 3 is provided between the rotating shaft 1 and the casing 2. The primary bearing 3 is, in normal operation, loaded—i.e. is in engagement with the shaft 1.

The assembly also comprises a secondary bearing assembly 4, axially displaced, with respect to the shaft longitudinal axis, from the primary bearing 3.

In the preferred arrangement, the rotating shaft 1 extends axially beyond the primary bearing 3. The secondary bearing is mounted in the casing surrounding this axially extended part of the shaft 1.

During normal operation, the primary bearing is in engagement with the shaft 1 and the casing and the secondary bearing assembly 4 is, in normal operation, unloaded—i.e. it is normally radially spaced from the shaft so that it is not in engagement with the shaft.

In the event of a failure in the primary bearing 3, the shaft 1 will move towards the casing 2 creating a backlash effect. The secondary bearing assembly acts as a fail safe bearing and 'catches' the shaft so that it can continue to rotate, thus avoiding a catastrophic failure. The secondary bearing is then in frictional engagement with the shaft.

In other words, when the primary bearing fails, the bearing or loading effect between the shaft 1 and the casing is removed and there is a backlash movement of the shaft 1 towards the casing. The secondary bearing assembly 4 is positioned on the casing such that the shaft 1 then comes into frictional engagement with the secondary bearing, rather than with the casing, and can continue to rotate using the secondary bearing assembly 4.

The secondary bearing assembly is, however, only an emergency solution for example while the aircraft is in flight, and it is important that failure of the primary bearing is notified so that this can be repaired as soon as possible.

According to the present disclosure, this notification is provided by means of a witness part or inspection member that indicates when the primary bearing has failed.

Figure 2:
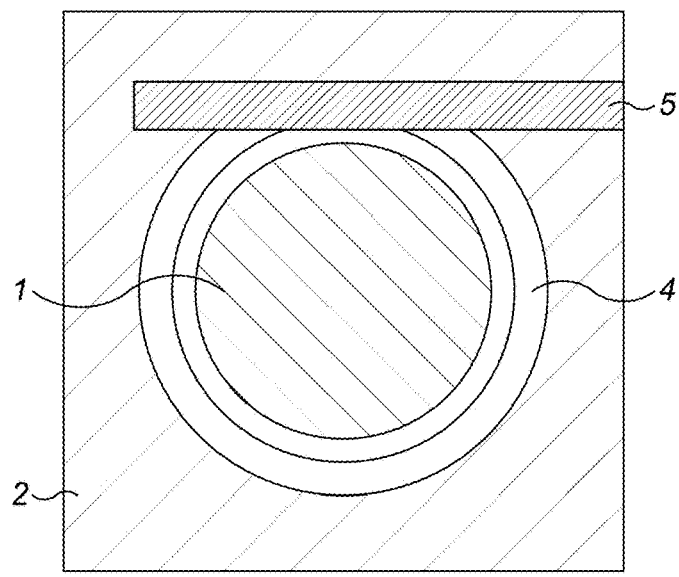
FIG. 2 is a schematic view of a detail of one embodiment of the fail safe bearing assembly.

In the embodiment shown in FIG. 2, the witness part or inspection member is a pin 5 or the like positioned within the secondary bearing such that as the secondary bearing comes into engagement with the shaft 1, the pin 5 also engages with the rotating shaft. This engagement of the pin 5 causes, for example, wear or some other change in characteristic or property of the pin such as distortion of plastic distortion e.g. if the pin is made of a softer material. At an appropriate time (e.g. after the aircraft has landed) the pin 5 can be removed and examined for wear etc. which would indicate frictional engagement with the shaft and, therefore, indicate that the secondary bearing was in use, and, thus, failure of the primary bearing.

Figure 3:
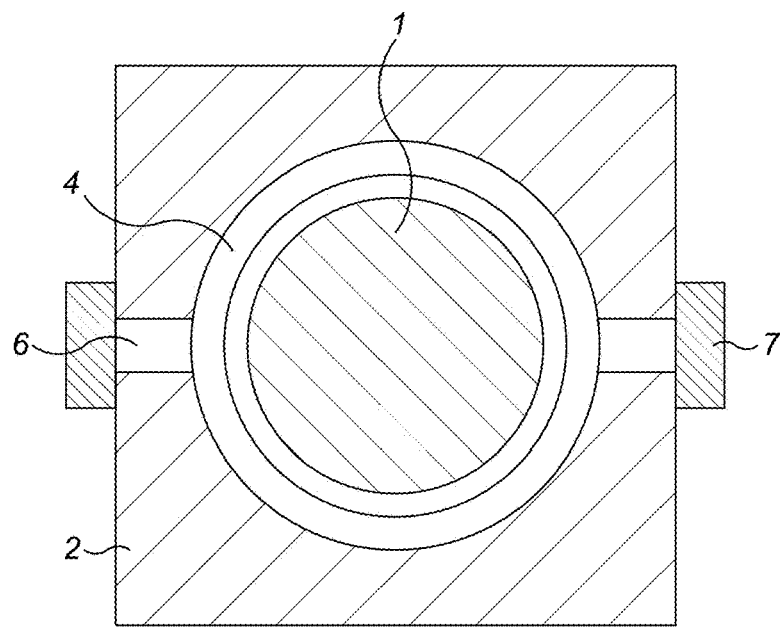
FIG. 3 is a schematic view of another embodiment of the fail safe bearing assembly.

In an alternative embodiment shown in FIG. 3, an integrated witness part is not required; instead, the bearing assembly and/or casing is provided with one or more inspection ports 6. These are preferably closed, during normal operation, by e.g. a sealing plug 7 which can be removed for inspection purposes. During a maintenance check, the radial backlash of the shaft 1 can be measured through the port(s) 6 e.g. by insertion of a jig (not shown) or the like. In the embodiment shown in FIG. 3, the assembly is provided with two diametrically opposing inspection ports 6. The backlash can be measured by inserting jigs into the ports and pushing the shaft alternately from each side to identify the degree of backlash and thus identify whether the primary bearing has failed.

With the present arrangement, it is possible to detect engagement of the secondary bearing and, thus, failure of the primary bearing without needing to disassemble the entire unit in which the shaft rotates and without, therefore, needing to drain away lubricant etc. The secondary bearing allows the shaft etc. to continue to rotate safely in the event of failure of the primary bearing until inspection/maintenance is possible and then failure of the primary bearing can be easily identified during a simple inspection/maintenance routine.

The invention claimed is:

1. A bearing assembly comprising:
   a secondary bearing arranged to make contact with a rotating part in the event of failure of a primary bearing normally in contact with the rotating part, and
   an inspection member insertable into and removeable from the secondary bearing to provide an indication of engagement of the secondary bearing with the rotating part wherein the inspection member comprises a pin in or insertable into the secondary bearing that also contacts the rotating member along with the secondary bearing and whose physical properties are changed by the contact.

2. The bearing assembly of claim 1, wherein the bearing assembly is provided with one or more inspection ports via which a relative position and/or backlash of the rotating part with respect to the secondary bearing can be determined by insertion of an inspection member.

3. A rotating shaft assembly comprising:
   a rotating shaft mounted within a casing;
   a primary bearing assembly including a bearing assembly as claimed in claim 1, wherein the primary bearing assembly is in bearing engagement with the shaft and the casing and is positioned between the shaft and the casing.

4. A method of identifying failure of a primary bearing, in a bearing assembly, comprising:
   inserting an inspection member into the bearing assembly; and
   removing the inspection member and examining a physical properaty of the inspection member for an indication of engagement of a secondary bearing with a rotating part, wherein the primary bearing is normally in engagement with the rotating part and the secondary bearing is normally not in engagement with the rotating part, the secondary bearing coming into engagement with the rotating part in the event of failure of the primary bearing.

5. The method of claim 4, wherein the inspection member comprises a pin in the secondary bearing that also contacts the rotating member along with the secondary bearing and whose physical properties are changed by the contact.

6. The method of claim 4, wherein the bearing assembly is provided with one or more inspection ports via which a relative position and/or backlash of the rotating part with respect to the secondary bearing can be determined by insertion of an inspection member.

\* \* \* \* \*